US008514772B2

(12) United States Patent
Yano et al.

(10) Patent No.: US 8,514,772 B2
(45) Date of Patent: Aug. 20, 2013

(54) HANDOVER METHOD IN CDMA MOBILE COMMUNICATION, BASE STATION AND MOBILE STATION

(75) Inventors: Tetsuya Yano, Kawasaki (JP); Kazuo Kawabata, Kawasaki (JP); Kazuhisa Obuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1510 days.

(21) Appl. No.: 10/746,599

(22) Filed: Dec. 23, 2003

(65) Prior Publication Data

US 2004/0136345 A1 Jul. 15, 2004

Related U.S. Application Data

(62) Division of application No. 09/377,138, filed on Aug. 19, 1999, now Pat. No. 6,711,149.

(30) Foreign Application Priority Data

Aug. 19, 1998 (JP) ..................................... 10-232934

(51) Int. Cl.
*H04B 7/216* (2006.01)
(52) U.S. Cl.
USPC ............................. 370/320; 370/330; 370/331
(58) Field of Classification Search
USPC .................. 370/278, 281, 295, 320, 326, 330, 370/331, 335, 342, 441, 470, 481, 506, 510
See application file for complete search history.

(56) References Cited

U.S. PATENT DOCUMENTS

| | | | | | |
|---|---|---|---|---|---|
| 5,581,548 | A | * | 12/1996 | Ugland et al. | 370/330 |
| 5,673,260 | A | * | 9/1997 | Umeda et al. | 370/342 |
| 5,732,076 | A | * | 3/1998 | Ketseoglou et al. | 370/347 |
| 5,805,581 | A | * | 9/1998 | Uchida et al. | 370/335 |
| 5,883,888 | A | | 3/1999 | St-Pierre | |
| 5,940,743 | A | | 8/1999 | Sunay et al. | |
| 6,078,570 | A | * | 6/2000 | Czaja et al. | 370/331 |
| 6,307,840 | B1 | | 10/2001 | Wheatley et al. | |
| 7,236,787 | B1 | * | 6/2007 | Tamura et al. | 455/437 |
| 2004/0136345 | A1 | * | 7/2004 | Yano et al. | 370/335 |

FOREIGN PATENT DOCUMENTS

EP 0 845 877 A2 6/1998
WO WO 94/30024 12/1994

* cited by examiner

*Primary Examiner* — Andrew Lai
*Assistant Examiner* — Leon Andrews
(74) *Attorney, Agent, or Firm* — Myers Wolin, LLC

(57) ABSTRACT

The present invention relates to a handover method in CDMA mobile communication. A base station and a mobile station of the same establishes synchronization after the handover by correcting a discrepancy of a frame number on the base station side to reduce the processing load of the mobile station. Further, at the same time, optimumly performing a phase correction of the frame. In particular, a mobile station MS measures a time difference □ between a frame timing in an upstream traffic channel and a frame timing in a perch channel from a second base station BS2. Further, the second base station transmits the time difference □ to a base station in communication BS1. The base station BS1 sends the time difference □ and a frame number FN1 in the upstream traffic channel in communication to the base station BS2. The base station BS2 corrects the phase of the spread code at the reception of the upstream traffic channel based on the received time difference □ of the frame timing and the notified frame number FN1.

6 Claims, 16 Drawing Sheets

HANDOVER METHOD IN CDMA MOBILE COMMUNICATION, BASE STATION AND MOBILE STATION

CROSS-REFERENCE TO RELATED APPLICATION

The present application is a Divisional of U.S. application Ser. No. 09/377,138 filed on Aug. 19, 1999 now U.S Pat. No. 6,711,149.

BACKGROUND OF THE INVENTION

The present invention relates to a handover method for a CDMA mobile communication using a spread spectrum signal, for a base station and a mobile station of the same.

The CDMA method is a leading candidate for the next generation of mobile communication systems as a multiple access method capable of rapidly increasing the system capacity (number of channels). Progress is being made in standardization for practical use.

Presently, in the wideband CDMA mobile communication system being standardized, communication information between a base station and a mobile station is spread in frame units. The frame units are obtained by partitioning the information into predetermined lengths, for example, 10 msec (hereinafter, this frame unit will be referred to as a "radio frame").

An upstream traffic channel signal from a mobile station is spread using a spread code initialized for every "super frame" comprised of 72 radio frames as a unit period. For this reason, when performing control to switch (handover) a communication channel from a first base station in communication to a second base station when a mobile station moves from a radio zone of the first base station to a radio zone of the second base station, it is necessary to synchronize the upstream traffic channel signal in communication with the phase of the spread code at the second base station for reception of the upstream traffic channel.

In other words, it is necessary to correct the discrepancy of frame numbers (corresponding to the phases of the spread code) of the radio frame between the first base station in communication and the second base station. Further, it is necessary to correct the discrepancy of frame timings within one frame time. For this reason, a perch channel signal giving reference timing for measuring the discrepancy of the timings of the radio frames is transmitted from the second base station. The mobile station measures the discrepancy of the radio frames between the first base station in communication and the second base station based on this perch channel signal, and then sends the information to the first base station in communication. The second base station receives the information via a higher rank communication network and corrects the radio frame number for receiving the upstream traffic channel signal and the timing thereof, that is, the phase of the radio frame, according to the information.

FIG. 16 shows the phase correction of the radio frame of the related art. (A) of the figure shows a transmission radio frame for a downstream traffic channel signal of a first base station BS1 in communication. (B) of the figure shows a received radio frame of the downstream traffic channel signal of a mobile station MS before handover. (C) of the figure shows a transmission radio frame of the upstream traffic channel signal of the mobile station MS.

(D) of the figure shows the transmission radio frame of the perch channel signal of a second base station BS2. (E) of the figure shows the reception radio frame of the perch channel signal of the mobile station MS and (F) of the figure shows the reception radio frame of the upstream traffic channel signal of the second base station BS2.

Further, (G) of the figure shows the transmission radio frame of the downstream traffic channel signal of the second base station BS2. (H) of the figure shows the receiving frame of the downstream traffic channel signal of the mobile station MS after handover.

The transmission radio frame (A) of the downstream traffic channel signal from the first base station BS1 is received at the mobile station MS along with a propagation delay of the radio section. The mobile station transmits the radio frame (C) in the upstream traffic channel after an elapse of a predetermined timing (1024 chips) from the reception radio frame (B) of the downstream traffic channel signal.

At the time of the handover, the mobile station MS receives (E) the perch channel signal transmitted (D) from the second base station BS2. The mobile station then extracts the frame number written in each radio frame of the perch channel and, measures the discrepancy between that frame number and the frame number of the upstream traffic channel presently being transmitted, and the discrepancy of the timings of the radio frames within one frame. The mobile station MS sends radio frame phase discrepancy information $T_{DHO}$ indicating the discrepancy of these frame numbers and the discrepancy of the timings of the radio frames within one frame to the first base station.

The first base station BS1 sends the radio frame phase discrepancy information $T_{DHO}$ to the second base station BS2 via the higher rank communication network. The second base station BS2 then corrects the reception phase of the radio frame in the upstream traffic channel based on the radio frame phase discrepancy information $T_{DHO}$ and brings the phase of the reception radio frame (E) of the upstream traffic channel signal of the second base station BS2 into coincidence with the phase of the transmission radio frame (C) of the upstream traffic channel signal from the mobile station MS. Note that the phase correction of the propagation delay in the radio section is also carried out.

The second base station BS2 transmits (G) the downstream traffic channel signal with a timing advanced from the phase of the reception radio frame (F) of the upstream traffic channel signal by 1024 chips. The reason for this is that, as mentioned above, the mobile station transmits the radio frame in the upstream traffic channel after the timing of 1024 chips from the phase of the reception radio frame (H) of the downstream traffic channel signal, so as to coincide with that timing.

In other words, in the phase correction of a radio frame of the related art, the mobile station MS must extract the frame number written in the radio frame in the perch channel and measure the discrepancy of the timings of the radio frames within one frame between the perch channel and the upstream traffic channel.

In view of the above discussion, when frequency bands used between the base stations differ, it is necessary that a mobile station receive a downstream traffic channel signal from the base station in communication at the time of handover. It is also necessary that the mobile station receives a perch channel signal transmitted by the second base station while despreading and decoding the downstream traffic channel. Further, the perch channel must also be despread and decoded to extract the frame number thereof. Thus, the functional circuits of a mobile station have become complex. However, since a mobile station should have a minimal size and weight, it would be highly desirable to reduce the complexity of the functional circuits.

SUMMARY OF THE INVENTION

An object of the present invention is to realize handover which corrects the discrepancy of the frame numbers on the base station side and establishes a synchronization after handover to thereby make extraction of the frame number in the perch channel in the mobile station unnecessary.

Another object of the present invention is to reduce the processing load of the mobile station, and optimumly correct the phase of the radio frame.

These and other objects are met by a handover method in CDMA mobile communication according to the present invention that includes a handover method in CDMA mobile communication for transmitting and receiving between a mobile station and a base station in both upstream traffic channel signal and a downstream traffic channel signal. This communication is performed in units of a radio frame having a predetermined length, for spreading the upstream traffic channel signal from the mobile station to the base station by a spread code having a plurality of periods in the radio frames as one period and transmitting the spread signal.

The handover method includes a step of, at the mobile station, measuring a time difference of frame timings within one frame between the radio frame of a traffic channel with a first base station in communication and the radio frame of a perch channel from a second base station of a destination of the handover. Further sending the time difference information of frame timing within the one frame to the first base station.

A step of, at the first base station sending a time difference information of the frame timing within one frame and the frame number of the radio frame of the traffic channel in communication, which are both sent from the mobile station, via a higher rank communication network to the second base station.

A step of, at the second base station, performing a phase correction for bringing the phase of the spread code for receiving the radio frame in the upstream traffic channel of the second base station into coincidence with the phase of the spread code in the upstream traffic channel from the mobile station. This is accomplished using the time difference information of the frame timing within one frame and the frame number of the radio frame of the traffic channel in communication, which are both sent from the first base station.

The handover method according to the present invention includes additional steps at the second base station when synchronization cannot be established even if despreading the radio frame signal in the upstream traffic channel transmitted from the mobile station by a spread code of a phase corresponding to the frame number of the radio frame in the traffic channel in communication; which is sent by the first base station.

The method includes advancing the phase of the spread code for receiving the radio frame at the period of the next radio frame to the phase corresponding to the radio frame of the next period to try the despread of the radio frame signal in the upstream traffic channel. Further, sequentially advancing the phase of the spread code for every period of said radio frame until synchronization is established.

Bringing the phase of the spread code for receiving the radio frame in the upstream traffic channel at the second base station into coincidence with the phase of the spread code of the radio frame in the upstream traffic channel from the mobile station to perform the phase correction.

The handover method according to the present invention further includes the second base station, temporarily setting the spread code of the phase corresponding to the frame number advanced by a predetermined number from the frame number of the radio frame in the traffic channel in communication which is sent from the first base station.

Despreading by the temporarily set spread code for each radio frame signal of the upstream traffic channel sequentially transmitted from the mobile station until the establishment of synchronization is detected, Bringing the phase of the spread code for receiving the radio frame in the upstream traffic channel at the second base station into coincidence with the phase of the spread code of the radio frame in the upstream traffic channel from the mobile station to perform the phase correction.

The handover method according to the present invention further includes the second base station, detecting the frame number of the perch channel of the second base station when notified of time difference information of frame timing within the one frame from the first base station. Further, transmitting a first transmission delay measurement-use signal to the first base station.

The first base station transmitting to the second base station a second transmission delay measurement-use signal including the frame number of the traffic channel at the first base station when receiving the first transmission delay measurement-use signal.

The second base station finding an amount of transmission delay between the first base station and the second base station by using a difference between a value of the frame number, at the reception of the second transmission delay measurement-use signal, of the perch channel of the second base station and a value of the frame number, at the transmission of the first transmission delay measurement-use signal, of the perch channel of the second base station.

The second base station, correcting the frame number of the traffic channel of the first base station included in the second transmission delay measurement-use signal based on the amount of transmission delay, to make the spread code of the phase corresponding to the corrected frame number as the spread code for receiving the radio frame in the upstream traffic channel of the second base station.

Bringing the phase of the spread code for receiving the radio frame in the upstream traffic channel of the second base station into coincidence with the phase of the spread code of the radio frame in the upstream traffic channel from the mobile station to perform the phase correction.

The handover method in a CDMA mobile communication for transmitting and receiving between a mobile station and a base station an upstream traffic channel signal and a downstream traffic channel signal in units of a radio frame having a predetermined length. The upstream traffic channel signal from the mobile station to the base station is spread by a spread code having a plurality of periods of the frames as one period and transmitting the spread signal.

The method including a second base station which is the destination of the handover after performing the phase correction, starting the transmission of the downstream traffic channel signal.

The handover method according to the present invention further includes that the second base station notifies the start of the transmission of the downstream traffic channel signal via the first base station to the mobile station. Further, the mobile station switches a communication frequency band from the frequency band of the first base station to the frequency band of the second base station when receiving the notification.

Further, the handover method according to the present invention includes that the mobile station sends the time difference information of the frame timing within said one frame to the first base station and then monitors the transmission start of the downstream traffic channel signal from the second base station.

The communication frequency band is also switched from the frequency band of the first base station to the frequency band of the second base station when detecting the transmission start of the downstream traffic channel signal from the second base station.

Further, the present invention provides a handover method in CDMA mobile communication for transmitting and receiving between a mobile station and a base station in an upstream traffic channel signal and a downstream traffic channel signal. The communication is performed in units of a radio frame having a predetermined length, for spreading the upstream traffic channel signal from the mobile station to the base station by a spread code having a plurality of periods of the radio frame as one period and transmitting the spread signal.

The method includes the mobile station, after sending the time difference information of the frame timing within one frame to a first base station in communication, continuing the communication with the first base station for a predetermined time period.

The second base station which is the destination of handover, performs the phase correction when the upstream traffic channel signal is not received from the mobile station, notifying to the mobile station of an alarm via the first base station within the predetermined time period.

The mobile station switching the communication frequency band from the frequency band of the first base station to the frequency band of the second base station after an elapse of the predetermined time period if there is no alarm.

The present invention also provides a handover method including a mobile station that switches the communication frequency band from the frequency band of the first base station to the frequency band of the second base station immediately after sending time difference information of the frame timing within one frame to the first base station in communication. Further, the second base station performs phase corrections.

The present invention provides a mobile station that measures the time difference of frame timings within one frame between the radio frame in the traffic channel with the first base station and the radio frame in the perch channel from the second base station. Then sending the time difference information of frame timing within the one frame to the base station.

Further, the first base station, sending the time difference information of the frame timing within one frame sent from the mobile station via the higher rank communication network to the second base station. The second base station corrects reception timing for bringing the frame timing of the radio frame in the upstream traffic channel of the second base station into coincidence with the frame timing of the radio frame in the upstream traffic channel from the mobile station. This is accomplished by using the time difference information of the frame timing within the frame sent from the first base station.

The mobile station initializes the phase of the spread code in the upstream traffic channel when switching the communication frequency band from the frequency band of the first base station to the frequency of the second base station alternatively sending the time difference information of the frame timing within the one frame to the first base station.

The second base station also initializes the phase of the spread code for receiving the radio frame in the upstream traffic channel when the time difference information of the frame timing within the one frame is sent from the first base station.

Further in the handover method, the second base station performs the phase correction as set when the establishment of synchronization is not detected when receiving the upstream traffic channel signal from the mobile station.

A base station in a CDMA mobile communication system according to the present invention for transmitting and receiving with a mobile station in an upstream traffic channel signal and a downstream traffic channel signal. The communication is performed in units of a radio frame having a predetermined length, for despreading the upstream traffic channel signal from the mobile station to the base station by a spread code having a plurality of periods of the radio frame as one period and receiving the despread signal.

The base station includes means for receiving time difference information of frame timings within one frame between a radio frame in a traffic channel and a radio frame in a perch channel of a base station of the destination of handover sent from the mobile station in communication.

Means for sending a frame number of the radio frame in the traffic channel of the mobile station and the time difference information of the frame timing within one frame sent from the mobile station to the base station of the destination of handover via higher rank communication network.

Means for performing the phase correction for bringing a phase of a spread code for receiving the radio frame in the upstream traffic channel of the mobile station into coincidence with a phase of a spread code of the radio frame in the upstream traffic channel from the mobile station. This is accomplished based on the time difference information of the frame timing within the one frame and the frame number of the radio frame in the traffic channel which are both sent from the base station in communication.

The base station according to the present invention is also provided with means for sequentially incrementing every other frame number of the radio frame notified from the base station in communication for every period of the radio frame until synchronization is established. Further, means for despreading the upstream traffic channel signal by a spread code of a phase corresponding to the frame number to detect the establishment of synchronization to perform the phase correction.

According to the present invention, the base station is also provided with means for temporarily setting a spread code of a phase corresponding to the frame number advanced by a predetermined number from the frame number of the radio frame notified from the base station in communication. Further, means for despreading by temporarily setting the spread code for each radio frame signal in the upstream traffic channel sequentially transmitted from the mobile station until the establishment of synchronization is detected to perform the phase correction.

The base station according to the present invention also includes means for detecting the frame number in the perch channel when notified of time difference information of the frame timing within the one frame from the base station in communication with the mobile station. Further, means for transmitting a first transmission delay measurement-use signal to the base station in communication with the mobile station.

Means for transmitting to a base station of the destination of handover a second transmission delay measurement-use signal including the frame number in the traffic channel when receiving the first transmission delay measurement-use signal from the base station of the destination of handover.

Means for receiving the second transmission delay measurement-use signal and finding an amount of transmission delay between the base station in communication with the mobile station and the base station which is the destination of handover. The amount of transmission delay is found from the difference between the value of the frame number in the perch channel at the time of reception and the value of the frame number in the perch channel at the time of transmission of the first transmission delay measurement-use signal.

Means for correcting the frame number in the traffic channel included in the second transmission delay measurement-use signal based on the amount of transmission delay, to make the spread code of the phase corresponding to the corrected frame number as the spread code for receiving the radio frame in the upstream traffic channel after handover.

The base station is provided with means for starting the transmission of the downstream traffic channel signal after handover after performing the phase correction.

The base station is also provided with means for notifying the start of transmission of the downstream traffic channel signal via the base station in communication with the mobile station to the mobile station.

Further, the base station is provided with means for notifying the mobile station of an alarm via the base station in communication with the mobile station when the upstream traffic channel signal is not received from the mobile station within a predetermined time period after performing the phase correction.

The base station according to the present invention includes means for receiving time difference information of the frame timings within one frame between a radio frame in a traffic channel and a radio frame in a perch channel of a base station, which is the destination of the handover sent from the mobile station.

Means for sending the time difference information of the frame timing within the one frame sent from the mobile station via the higher rank communication network to the base station which is the destination of handover.

A reception frame timing correcting means for bringing the frame timing into coincidence with the frame timing of the radio frame in the upstream traffic channel of the mobile station. This is accomplished by using the time difference information of the frame timing within one frame sent via the higher rank communication network.

Means for initializing a phase of a spread code that receives the upstream traffic channel signal when receiving the time difference information of the frame timing within one frame via the higher rank communication network.

The base station according to the present invention also is provided with means for performing the phase correction with respect to the upstream traffic channel signal after handover.

Further, according to the present invention, a mobile station in a CDMA mobile communication system for transmitting and receiving with a base station in an upstream traffic channel signal and a downstream traffic channel signal in units of a radio frame having a predetermined length. Further, for spreading the upstream traffic channel signal of the base station by a spread code having a plurality of periods of the radio frame as one period and transmitting the spread signal.

The mobile station including means for measuring the time difference of the frame timing within one frame between a radio frame in a traffic channel with a first base station in communication and a radio frame in a perch channel from a second base station, which is the destination of handover. Further, means for sending the radio frame phase information indicating only the time difference of the frame timing within the one frame to the first base station.

The mobile station is also provided with means for switching the communication frequency band from the frequency band of the first base station to the frequency band of the second base station when receiving the notification of start of the transmission of the downstream traffic channel signal from the second base station via the first base station.

The mobile station according to the present invention also includes means for monitoring the transmission start of the downstream traffic channel signal from the second base station after sending the radio frame phase information to the first base station means for switching the communication frequency band from the frequency band of the first base station to the frequency band of the second base station when detecting the transmission start of the downstream traffic channel signal from the second base station by the means for monitoring the transmission start.

The mobile station according to the present invention also includes means for continuing the communication with the first base station for a predetermined time period after sending the radio frame phase information to the first base station. Means for receiving an alarm notified from the second base station via the first base station.

Means for switching the communication frequency band from the frequency band of the first base station to the frequency band of the second base station after an elapse of the predetermined time period when the alarm is not received within the constant time. The mobile station is also provided with means for switching the communication frequency band from the frequency band of the first base station to the frequency band of the second base station immediately after sending the radio frame phase information to the first base station.

The mobile station is also provided with means for initializing the phase of the spread code in the upstream traffic channel after sending the radio frame phase information to the first base station.

The mobile station is also provided with means for transmitting the upstream traffic channel signal to the second base station with the same transmission power, when communicating with the first base station as an initial transmission power after handover.

The mobile station is also provided with means for transmitting the upstream traffic channel signal to the second base station with the transmission power designated by the second base station via the first base station as an initial transmission power after handover.

The mobile station also provided with means for determining an initial transmission power after handover based on the received power of the perch channel from the second base station.

Further, the mobile station is provided with means for determining an initial transmission power after handover based on the received power of the downstream traffic channel from the second base station.

DETAILED DESCRIPTION

For the following description, it is assumed that a mobile station MS performs communication at a frequency band f1 with a first base station BS1. Further, the mobile station moves from the radio zone of the first base station BS1 to the radio zone of the second base station BS2 using a frequency band f2 different from that of the first base station BS1. The mobile station MS is configured to detect a header position of a radio frame in a perch channel transmitted by the second base station BS2, measure a time difference $\tau$ between a header position of a radio frame in an upstream traffic channel and the header position of the radio frame in the perch channel of the second base station BS2 and then reports this to the first base station BS1.

Figure 1:
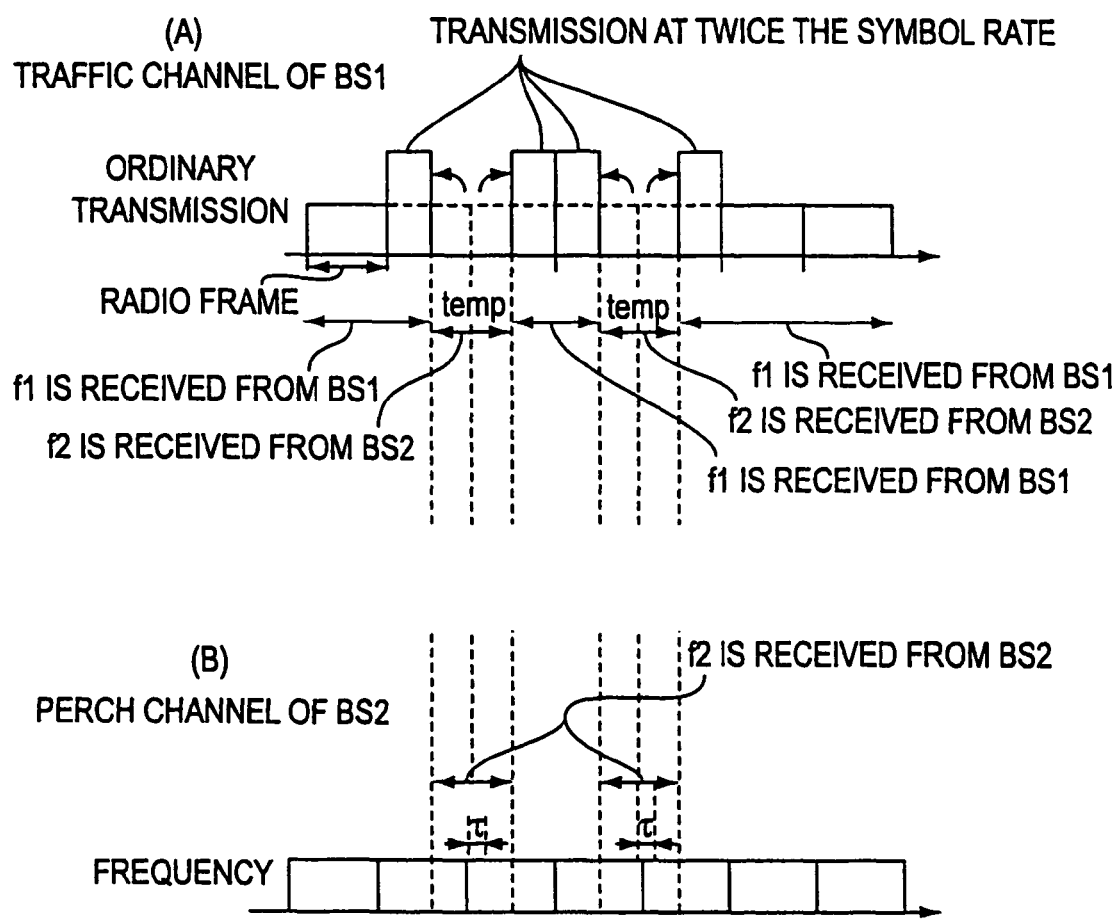
FIG. 1 is a diagram showing the measurement of a time difference for frame timing at a mobile station.

FIG. 1 is the measurement of the time difference $\tau$ of the frame timings at the mobile station. (A) of the figure shows the radio frame in the downstream traffic channel from the first base station BS1. Further, (B) of the figure shows the radio frame in the perch channel from the second base station BS2.

In the situation where base stations having different available frequency bands in the adjoining radio zones, the base station compresses the communication information of one radio frame to half the time width of an ordinary transmission as shown in (A) of FIG. 1. Further, the base station transmits the same at twice the transmission rate (compression mode). The amount of information transmitted is the same as that of the case of the ordinary transmission.

Accordingly, the mobile station MS receives the communication information of one frame in half the time width. The remaining time width is an empty time period $t_{empo}$. The mobile station MS receives the perch channel from the second base station BS2 by utilizing the empty time period $t_{empo}$. Further, the mobile station MS measures the time difference $\tau$ between the frame timing in the upstream traffic channel and the frame timing in the perch channel from the second base station.

The mobile station MS receives the downstream traffic channel signal of the frequency band f1 from the first base station BS1 as a compressed frame, which is half a time width. The mobile station then switches the frequency band of the receiver to the frequency band f2 of the second base station BS2 during the remaining half timewidth, despreads the perch channel signal from the second base station BS2 by the perch channel reception-use spread code common to the system, and detects the timing of the header of the radio frame in the perch channel of the second base station BS2.

The discrepancy $\tau$ of the frame timings within one frame time is then measured from the time difference between that timing and the timing of the header of the radio frame in the upstream traffic channel.

Figure 2:
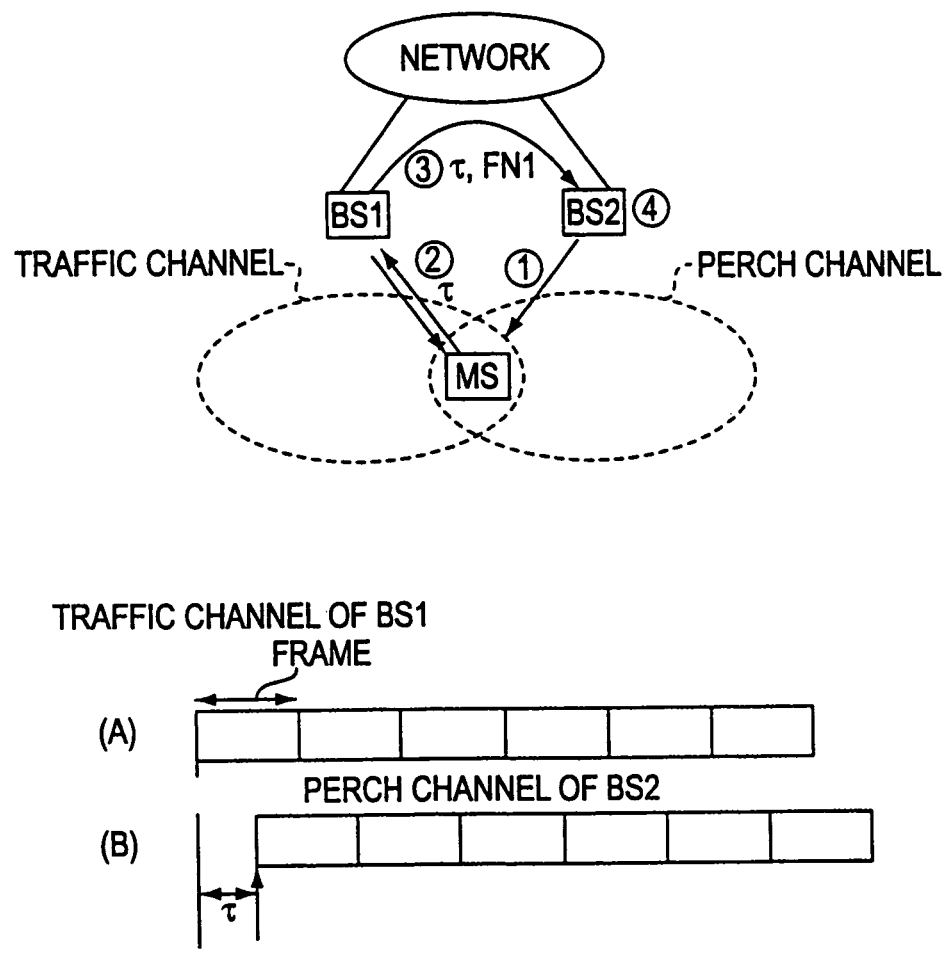
FIG. 2 is a diagram showing the first embodiment of the correction of phase for a radio frame according to the present invention.

FIG. 2 shows a first embodiment of the phase correction of a radio frame according to the present invention. In the figure, it is assumed that the mobile station MS is in communication with the first base station BS1 and moves to the radio zone of the second base station BS2. The first base station BS1 and the second base station BS2 are connected to each other via the higher rank communication network.

Further, (A) of the figure shows the traffic channel of the first base station BS1, and (B) of the figure shows the perch channel of the second base station BS2.

The phase correction of the radio frame is carried out by the following procedure. Note that the circled numerals in the figure correspond to numbers of this procedure and indicate the route of a signal during the execution of the procedure or the processing apparatus for executing the procedure.

The mobile station MS receives the radio frame in the perch channel from the second base station BS2 of the frame timing shown in (B) of the figure. Further, the MS detects the timing of the header thereof and then measures the discrepancy (time difference) $\tau$ of the timing within one frame time relative to the radio frame in the traffic channel of the first base station BS1 of the frame timing shown in (A) of the figure.

It should be noted that for each traffic channel of the mobile station, the first base station BS1 contains the upstream traffic channel and the downstream traffic channel. Since there is a relationship in the timing of these radio frames, the predetermined time interval (1024 chips) is held as mentioned above. The difference relative to a radio frame in either the downstream traffic channel or the upstream traffic channel may be measured as the time difference $\tau$ relative to the perch channel. Here, an explanation is made of an example where the correction is carried out by measuring the phase difference relative to the radio frame in the upstream traffic channel.

The mobile station MS sends the measured time difference $\tau$ to the first base station BS1. The first base station BS1 sends the time difference $\tau$ received from the mobile station MS and the frame number FN1 of the radio frame in the upstream traffic channel in communication at the first base station BS1 to the second base station BS2 via the communication network.

The second base station BS2 determines the phase of the radio frame (phase of the spread code) in the traffic channel for performing communications with the mobile station MS after the handover based on the time difference τ received from the first base station BS1 and the frame number FN1 of the radio frame in communication.

The procedure of the phase correction for the radio frame according to this first embodiment is similarly applied to a case where the first base station BS1 and the second base station BS2 use the same frequency band. In this case, the radio frame in the traffic channel transmitted from the first base station BS1 is transmitted without being compressed as shown in FIG. 1. Therefore, the ordinary transmission mode is used.

In this case, the downstream traffic channel from the first base station BS1 and the perch channel from the second base station BS2 are transmitted while being spread by spread codes different from each other. The mobile station MS then despreads these channels by the spread codes to receive the two channels in parallel by using receivers of the same frequency band.

Figure 3:
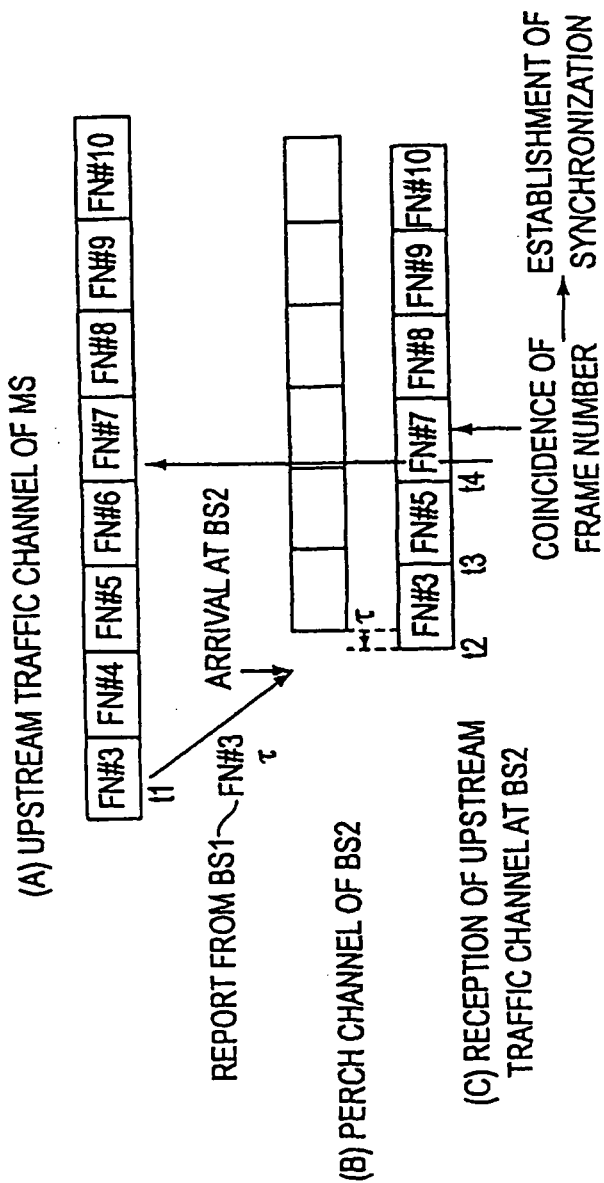
FIG. 3 is a diagram showing a second embodiment of the correction phase for a radio frame according to the present invention.

FIG. 3 shows a second embodiment of the phase correction of the radio frame according to the present invention. (A) of the figure shows the upstream traffic channel of the mobile station MS. (B) of the figure shows the perch channel from the second base station BS2, and (C) of the figure shows the phase of the spread code (hereinafter referred to as the reception phase) for receiving the radio frame in the upstream traffic channel at the second base station BS2.

The situation where the transmission delay in the higher rank communication network reaching the second base station BS2 from the first base station BS1 is large, the second base station BS2 determines the phase of the radio frame for receiving the upstream traffic channel signal from the mobile station MS by using the frame number received from the first base station BS1 and the time difference τ of the frame timings. Moreover, at the time of this determination, there is still a possibility that the communication will be carried out between the first base station BS1 and the mobile station MS by a radio frame advanced from the frame number sent to the second base station BS2.

In such a case, even if the despreading is attempted in the second base station BS2 with the phase of the determined radio frame (phase of the spread code), the despreading would not be successful since the upstream traffic channel signal from the mobile station MS is not synchronized with BS2.

Explaining this situation by using FIG. 3, assume that the first base station BS1 notifies a frame number FN#3 in communication and the time difference τ of the frame timing to the second base station BS2 via the higher rank communication network at a time t1. Assume then that this information arrives at the second base station BS2 with a time lag of one frame or more due to the transmission delay. Thus, at a time t2, the second base station BS2 determines the phase of the radio frame as the frame number FN#3.

However, at the time t2, the upstream traffic channel of the mobile station MS has already advanced to a frame number FN#5. Thus, even if the radio frame in the upstream traffic channel from the mobile station MS is despread in the second base station BS2 with a spread code corresponding to the frame number FN#3, the synchronization cannot be established.

In view of the above problem, in the present invention, when asynchronization between the phase of the radio frame (phase of the spread code) determined by the received frame number and the radio frame in the upstream traffic channel from the mobile station MS is detected at the second base station BS2, the frame number is further incremented by one in the radio frame of the next period. The radio frame in the upstream traffic channel from the mobile station MS is then despread with the spread code of the incremented frame number, and the above operation is repeated until the synchronization is established.

Explaining the above operation by referring to FIG. 3, at the time t3, it is detected that the synchronization cannot be established with the spread code of the frame number FN#3. In the next frame period, the next frame number FN#4 is skipped since if the synchronization cannot be established by the frame number FN#3, the synchronization naturally cannot be established even by the spread code of the frame number FN#4 in the next period.

In the example shown in FIG. 3, at the time t3, the radio frame of a frame number FN#6 is transmitted from the mobile station MS, and synchronization still cannot be established. Therefore, at a time t4 of the next period, similarly the frame number is further incremented by one again to set the frame number to FN#7.

The radio frame of the frame number FN#7 is transmitted from the mobile station MS with respect to the frame number FN#7 set at the time t4, which enables the despreading to be optimumly carried out and the synchronization is established here. After this, the frame number may be sequentially incremented by one.

In this way, in the situation where the transmission delay of the transmission route reaching the second base station BS2 from the first base station via the higher rank communication network is large, the synchronization cannot be established with the phase of the radio frame of the frame number notified from the first base station BS1. Thus, according to this embodiment, the frame number is sequentially incremented every other frame number for every period of the radio frame until it catches up to the frame number transmitted from the mobile station MS in order to establish the synchronization. Note that this embodiment can be applied even in the case where the first base station BS1 and the second base station BS2 have the same frequency band.

Figure 4:
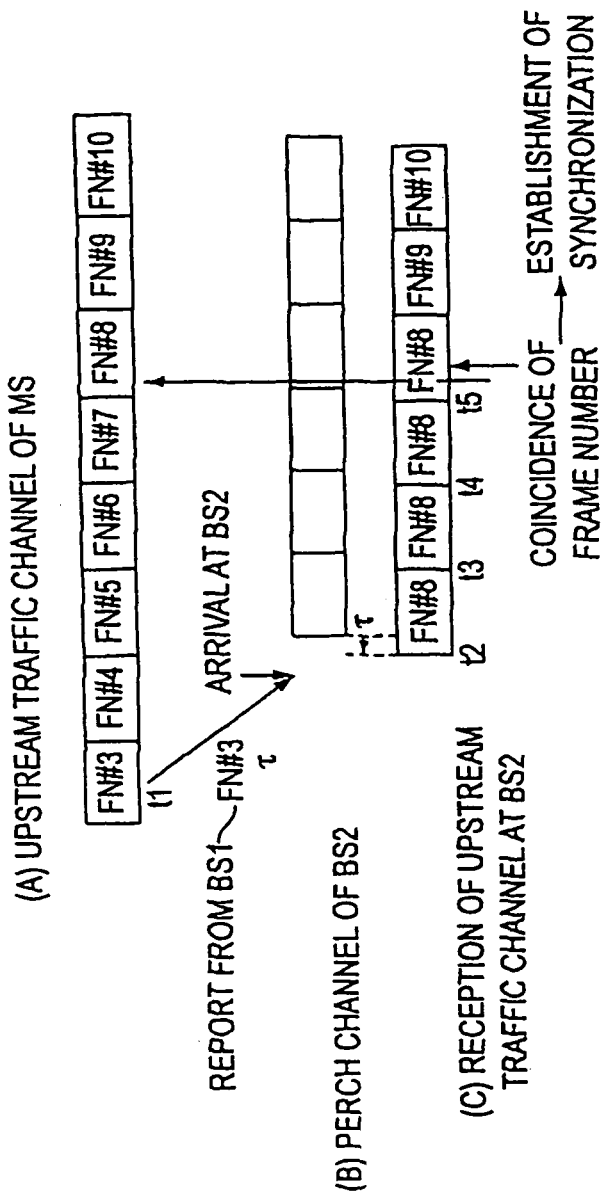
FIG. 4 is a diagram showing a third embodiment of the correction of phase for a radio frame according to the present invention.

FIG. 4 shows a third embodiment of the phase correction of a radio frame according to the present invention. (A) of the figure shows the upstream traffic channel of the mobile station MS, (B) of the figure shows the perch channel from the second base station BS2 and (C) of the figure shows the reception phase in the upstream traffic channel at the second base station BS2.

This embodiment is preferably applied to a case where the transmission delay from the first base station BS1 to the second base station BS2 is even larger. Thus, in addition a rough delay amount is estimated in advance. When the transmission delay from the first base station BS1 to the second base station BS2 is large, the mobile station MS transmits the radio frame of the frame number advanced from the frame number notified to the second base station BS2, as mentioned above.

In such a case, the second base station BS2 advances the frame number received from the first base station BS1 with respect to the estimated delay amount. In particular, the frame number received is advanced by the frame number for attaining a slight margin. The second base station BS2 continues the despreading, until synchronization is established for every radio frame of the upstream traffic channel signal received by the mobile station MS, by the spread code phase of the frame number. Therefore, the second base station holds this frame number and stands by for the establishment of the synchronization.

In the example shown in FIG. 4, it is assumed that the first base station BS1 sends the frame number FN#3 in communication and the time difference τ of the frame timing via the higher rank communication network to the second base station BS2 at the time t1. The notification information then arrives at the second base station BS2 with a time lag of one frame or more due to the transmission delay. At the time t2, the second base station BS2 sets a frame number FN#8 which was advanced by the frame number obtained by adding a margin to the estimated delay amount for the received frame number FN#3.

At the time t2, the upstream traffic channel of the mobile station MS still transmits the radio frame of the frame number FN#5. Thus, even if the radio frame from the mobile station MS is despread with the spread code phase of the frame number FN#8, synchronization cannot be established at the second base station BS2.

In view of the above, when detecting asychronization between the phase of the radio frame (phase of the spread code) and the radio frame of the upstream traffic from the mobile station MS, in the radio frame of the next period, the second base station BS2 holds the frame number without increment and performs the despreading of the radio frame of the upstream traffic from the mobile station MS with the same spread code phase.

In the example shown in FIG. 4, at a time t3, the frame number FN#8 is held by the detection of the asynchronization. The despreading is that carried out with respect to the radio frame of the frame number FN#6 transmitted from the mobile station MS in order to detect synchronization. In this case, synchronization is not detected. Thus, at the time t4, similarly the frame number FN#8 is held again, and the despreading is performed with respect to the radio frame of the next frame number FN#7 transmitted from the mobile station MS.

In this case as well, the synchronization is not detected. Thus, a similar operation is repeated. However, at the time t5, the radio frame of the frame number coincident with the frame number FN#8 is set and held at the second base station BS2, which is transmitted from the mobile station MS. Therefore, synchronization is established this time. After this, the frame number is sequentially incremented by one.

In this way, even where the transmission delay at the transmission route between the second base station BS2 and first base station BS1 via the higher rank communication network is large, a frame number is advanced from the received frame number by anticipating the amount of the transmission delay is set and the second base station BS2 stands by until the frame number of the radio frame transmitted from the mobile station MS catches up to the advanced frame number and then establishes the synchronization. The third embodiment can also be applied to a case where the first base station BS1 and the second base station BS2 have the same frequency band.

Figure 5:
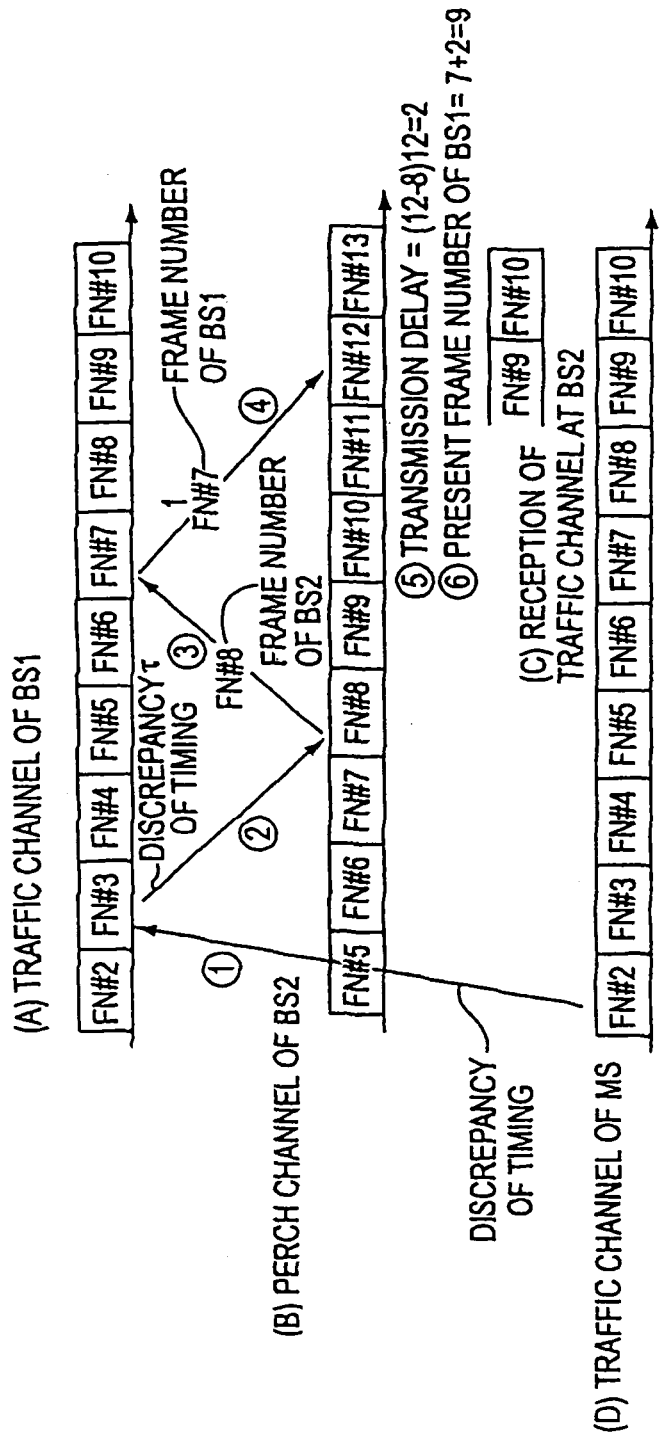
FIG. 5 is a diagram showing a fourth embodiment of correction of phase for a radio frame according to the present invention.

FIG. 5 shows a fourth embodiment of the phase correction of the radio frame according to the present invention. (A) of the figure shows the reception phase in the upstream traffic channel of the first base station BS1, (B) of the figure shows the perch channel from the second base station BS2, (C) of the figure shows the reception phase in the upstream traffic channel of the second base station BS2 and (D) of the figure shows the transmission phase in the upstream traffic channel of the mobile station MS.

The fourth embodiment also corrects the frame number in the case where the transmission delay from the first base station BS1 to the second base station BS2 is large.

The mobile station MS measures the time difference □ of the frame timing relative to the perch channel and then sends the time difference □ to the first base station BS1. The first base station BS1 sends the time difference τ to the second base station BS2 when the notification of the time difference τ of the frame timing is received from the mobile station MS. Note that, at this time, the frame number is not notified.

The second base station BS2 transmits the first transmission delay measurement-use signal containing the frame number (FN#8 in the case of the example shown in FIG. 5) in the perch channel of the second base station BS2 to the first base station BS1 when receiving the information of the time difference τ from the first base station BS1.

When receiving the first transmission delay measurement-use signal, the first base station BS1 applies the frame number (FN#7 in the case of the example shown in FIG. 5) to the traffic channel of the first base station BS1 at that time of the first transmission delay measurement-use signal and transmits this as the second transmission delay measurement-use signal to the second base station BS2.

The second base station BS2 subtracts the frame number (FN#8 above) in the perch channel of the second base station BS2 at the time of the previously transmitted first transmission delay measurement-use signal from the frame number (FN#12 in the case of the example of FIG. 5) in the perch channel of the second base station BS2 at the time of reception of the second transmission delay measurement-use signal. This subtraction finds a frame number difference thereof.

The above described frame number difference corresponds to the amount of turn around transmission delay between the first base station BS1 and the second base station BS2. Thus, by dividing the frame number difference by 2, the amount of one-way transmission delay from the first base station BS1 to the second base station BS2 is calculated. In the case of the illustrated example, the amount of one-way transmission delay becomes (12−8)/2=2.

The second base station BS2 adds the calculated amount of one-way transmission delay to the frame number (FN#7 above) in the traffic channel of the first base station BS1 contained in the second transmission delay measurement-use signal transmitted from the first base station BS1. The second base station BS2 then calculates the frame number in the traffic channel of the first base station BS1 at the time of the reception of the second transmission delay measurement-use signal. In the case of the illustrated example, the frame number of the first base station BS1 at the time of reception of the second transmission delay measurement-use signal is calculated as 2+7=9.

From this frame number and the time difference τ received via the first base station BS1, as shown in (C) of the figure, the phase of the spread code for despreading the upstream traffic channel from the mobile station MS at the second base station BS2, that is the phase of the radio frame, is determined. Note that this fourth embodiment can also be applied to the case where the first base station BS1 and the second base station BS2 have the same frequency band.

Figure 6:
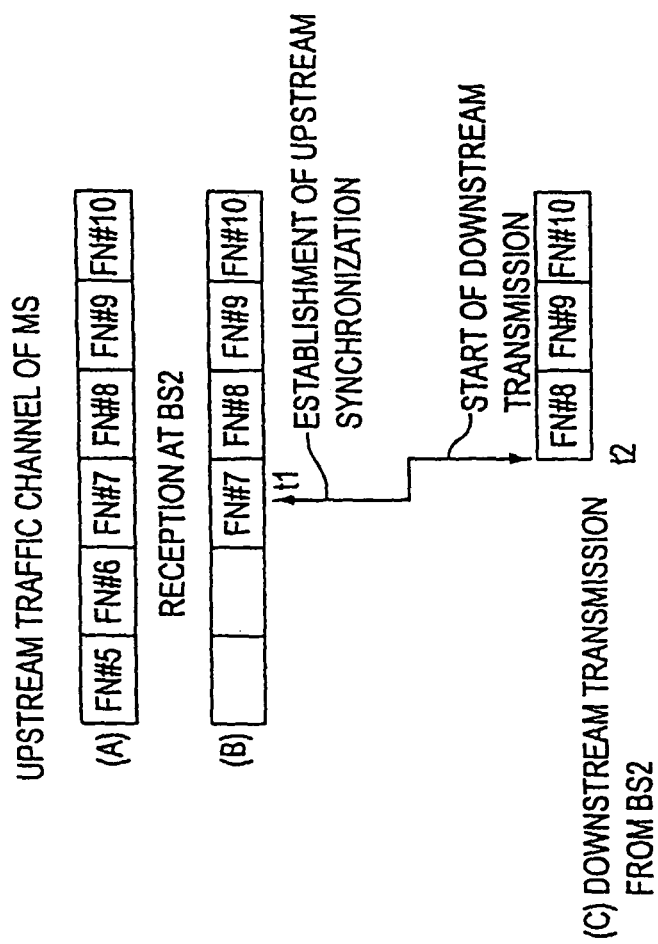
FIG. 6 is a diagram showing the start of a downstream traffic channel transmission to a base station that is the target of the handover according to the present invention.

FIG. 6 shows the start of the transmission of the downstream traffic channel for the second base station according to the present invention. (A) of the figure shows the transmission radio frame in the upstream traffic channel of the mobile station MS, (B) of the figure shows the reception radio frame in the upstream traffic channel of the second base station BS2, and (C) of the figure shows the transmission radio frame in the downstream traffic channel of the second base station BS2.

In the transmission of the downstream traffic channel at the second base station BS2, the phase correction of the radio frame according to any of the embodiments of the present invention previously described is used to bring the phase of the reception radio frame (B) in the upstream traffic channel at the second base station BS2 in coincidence with the phase of the transmission radio frame (A) in the upstream traffic channel from the mobile station MS (after the time t1 of the figure) for establishment of synchronization, as shown in (C) of FIG. 6. The transmission of the downstream traffic channel signal is then started from the header position (time t2 of the figure) of the radio frame of the frame number after the establishment of synchronization.

For the downstream traffic channel, the spread code is initialized for every radio frame of a 10 msec period. Thus, synchronization can be established in a short period of time. For this reason, the second base station BS2 is configured to start the transmission in the downstream traffic channel after the establishment of the synchronization in the upstream traffic channel. The second base station BS2 does not transmit the downstream traffic channel signal until synchronization is established in order to reduce the transmission of an undesired electric wave which can become a source of noise. Note that this structure can also be applied to the case where the first base station BS1 and the second base station BS2 have the same frequency band.

Figure 7:
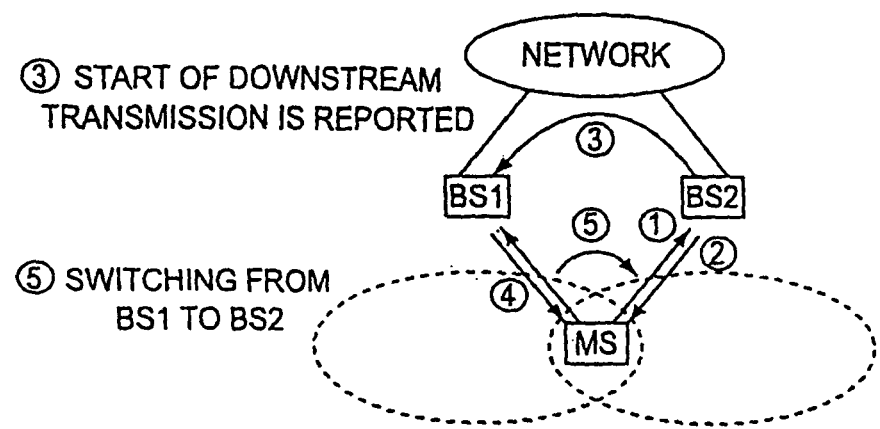
FIG. 7 is a diagram showing a first embodiment of the switching of base stations for a mobile station according to the present invention.

FIG. 7 shows a first embodiment of the switching of the base station at the mobile station according to the present invention. The mobile station MS switches the received downstream traffic channel from the first base station BS1 in communication to the second base station BS2. The procedure thereof is described below.

The second base station BS2 establishes synchronization with the upstream traffic channel signal from the mobile station MS. The second base station BS2 then starts the transmission in the downstream traffic channel with the frequency band f2 different from that of the first base station.

Further, the second base station BS2 notifies the start of transmission in the downstream traffic channel to the first base station BS1 via the higher rank communication network. The first base station BS1 then notifies the mobile station MS that the second base station BS2 started the transmission in the downstream traffic channel. The mobile station MS switches the reception frequency band from the frequency band f1 of the first base station BS1 to the frequency band f2 of the second base station BS2.

Figure 8:
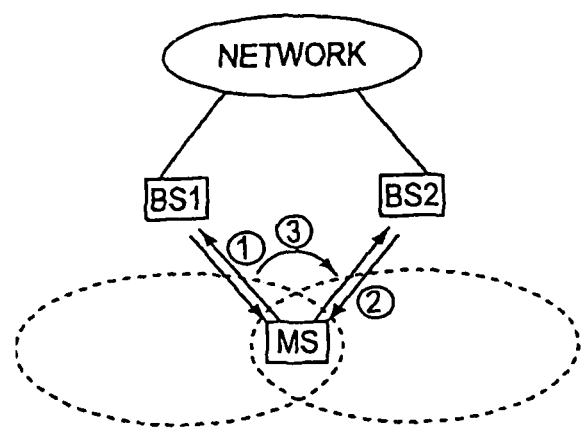
FIG. 8 is a diagram showing a second embodiment of the switching of base stations for a mobile station according to the present invention.

FIG. 8 shows a second embodiment the switching of the base station at the mobile station according to the present invention. The mobile station MS switches the base station to be linked by the following procedure.

The mobile station MS reports the time difference τ between frame timings of the first base station BS1 and the second base station BS2 to the first base station BS1 in 1.

The mobile station MS starts the monitoring of the downstream traffic channel signal from the second base station BS2 by utilizing the empty time period of the compression mode, as previously described. The mobile station MS then switches the frequency band from the first base station BS1 to the second base station BS2 in 3 at the time of detecting the downstream traffic channel signal from the second base station BS2. Further, the mobile station performs the communication thereafter only with the second base station BS2.

Note that, it is assumed that, when the downstream traffic channel signal is transmitted from the second base station BS2 in the compression mode, the second base station BS2 transmits a similar downstream traffic channel signal even in the empty time period of the compression mode.

Figure 9:
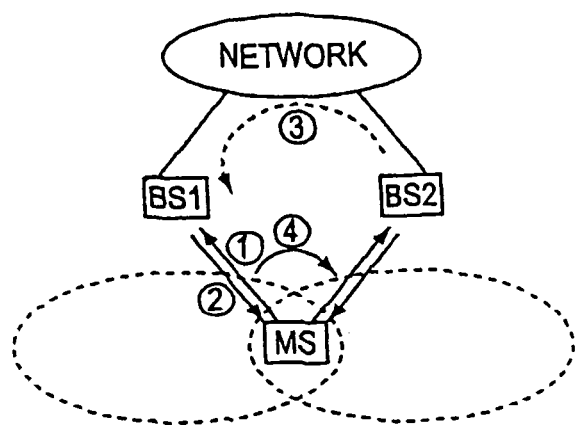
FIG. 9 is a diagram showing a third embodiment of the switching of base stations for a mobile station according to the present invention.

FIG. 9 shows a third embodiment the switching of the base station at the mobile station according to the present invention. The mobile station MS switches the base station to be linked by the following procedure.

The mobile station MS reports the time difference τ between frame timings of the first base station BS1 and the second base station BS2 to the first base station BS1 in 1.

Thereafter, the mobile station MS continues the communication with the first base station BS1 for a constant time period set in advance.

The second base station BS2 issues an alarm to the mobile station MS via the higher rank communication network at the first base station BS1 in 3. The mobile station is notified of the alarm within the above constant time period where the upstream traffic channel signal from the mobile station MS cannot be received after the frame phase information containing the time difference τ.

The mobile station MS then switches the receiving frequency band from the frequency band of the first base station BS1 to the frequency band of the second base station BS2 if it does not receive any alarm through the first base station BS1 within the above predetermined time period. After this, the mobile station performs the communication with the second base station BS2. If the mobile station MS receives the alarm within the above predetermined time period, the mobile station MS recognizes that the handover is impossible and displays this.

Figure 10:
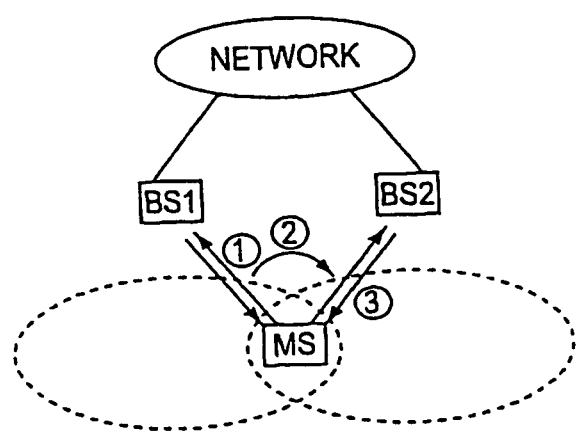
FIG. 10 is a diagram showing a fourth embodiment of the switching of base stations for a mobile station according to a the present invention.

FIG. 10 shows a fourth embodiment of the switching of the base station at the mobile station according to the present invention. The switching of the base station according to the above described first to third embodiments were predicated on the fact that the second base station BS2 functions to receive two frequency bands of the f1 and f2. However, the switching of the base station according to the fourth embodiment is an embodiment of the case where the second base station BS2 only functions to receive the frequency band f2. Thus, the upstream traffic channel signal of the mobile station MS performing the communication with the first base station BS1 cannot be received at the second base station BS2.

The mobile station MS switches the base station to be linked by the following procedure: The mobile station MS reports the time difference τ between frame timings of the first base station BS1 and the second base station BS2 to the first base station BS1 in 1.

The mobile station MS switches the transmission and reception frequency bands to the frequency band f2 of the second base station BS2 in 2. This switching occurs simultaneously with the report of the time difference τ. The mobile station MS then performs the communication with the second base station BS2 thereafter.

A delay of one frame or more can occur in the frame number sent from the first base station BS1 when performing the phase correction in the upstream traffic channel, as previously described. This correction includes the first base station sending both the time difference τ of the frame timing and the frame number. If such a delay occurs, the second base station BS2 receives the signal of the frequency band f2 transmitted from the mobile station MS after the switching of the base station and performs the phase correction of the radio frame according to the second or third embodiment of the present invention, as previously described.

In switching of the base station according to the fourth embodiment, an instantaneous stoppage will occur in the traffic channel until the second base station BS2 establishes the synchronization with the mobile station MS and the mobile station MS switches the transmission and reception frequency bands. However, the instantaneous stoppage is only for a small period of time, so not to cause an obstacle in speech, etc. in practice.

Accordingly, in switching of the base station according to the fourth embodiment, the base station is configured to transmit and receive only the signal of the frequency band used in its own apparatus. Therefore, the handover can be carried out even if it is unable to receive the signal of the frequency band used in the adjoining base station.

Note that the switching of the base station in the mobile station MS can be performed by providing a plurality of switching means according to the above embodiments and selecting one of these switching means by an instruction from the base station BS1 in communication at the start of the handover.

Figure 11:
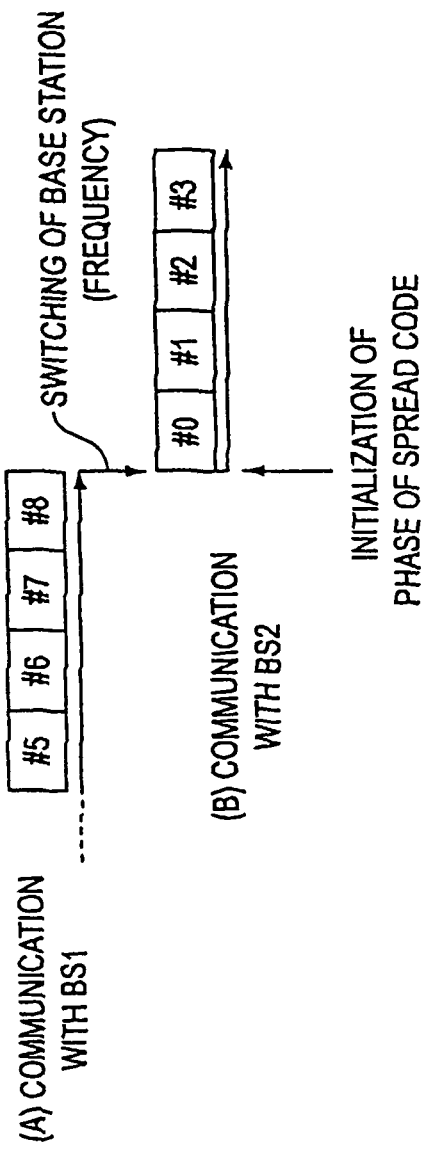
FIG. 11 is a diagram showing a handover by the initialization of phase for a spread code according to the present invention.

FIG. 11 shows the handover by the phase initialization of the spread code according to the present invention. (A) of the figure is the radio frame in the upstream traffic channel in communication with the first base station BS1 and (B) of the figure is the radio frame in the upstream traffic channel in communication with the second base station BS2 after handover.

As shown, when switching the frequency band from the first base station BS1 to the second base station BS2 and transmitting the upstream traffic channel signal, the mobile station MS initializes the phase of the spread code at the time of switching and transmits the same from the radio frame of the first frame number.

Further, the second base station BS2 initializes the phase of the spread code for the reception of the upstream traffic channel signal (despread) after the time difference □ of the frame timing is sent from the first base station BS1, as previously described.

Further, the second base station BS2 does not have to calculate the frame number presently being transmitted, in the upstream traffic channel (phase of the spread code for despread) of the mobile station MS. It is sufficient only to initialize the phase of the spread code at the time of the switching of the frequency band of the mobile station MS. Therefore, the processing required for this procedure is reduced.

Further, it is also sufficient that the first base station BS1 only sends the time difference □ of the frame timing to the second base station BS2. Therefore, the first base station BS1 does not have to notify the frame number in the upstream traffic channel in communication.

The principle of the phase correction of the radio frame according to this embodiment is equivalent to the first frame number #0 being always notified as the frame number in the upstream traffic channel to the second base station BS2 in the phase correction of the radio frame according to the first embodiment. Therefore, in this embodiment, since it is not necessary to send the fixed information, the notification of the frame number is not carried out.

In this embodiment, as in the switching of the base station at the mobile station MS according to the second embodiment shown in FIG. 8. The mobile station MS monitors the downstream traffic channel signal from the second base station BS2 utilizing the empty time period of the compression mode and switches the same to the frequency band of the second base station BS2 at the time of detecting the downstream traffic channel signal. Furthermore, the second base station BS2 brings the frame phase into coincidence with the upstream traffic channel from the mobile station MS by correcting the timing according to the time difference τ of the frame timing and initializing the phase of the spread code.

The reason for this is that the transmission timing of the radio frame in the upstream traffic channel from the mobile station has a predetermined relationship (the radio frame in the upstream traffic channel is transmitted after the elapse of the time of for example 1024 chips from the timing of reception of the radio frame in the downstream traffic channel) with the reception timing of the radio frame in the downstream traffic channel. Therefore, the second base station BS2 can correctly (note, an error due to jitter or the like is contained) predict the timing of the start of the transmission for the upstream traffic channel signal from the mobile station when the transmission of the downstream traffic channel signal is started.

As previously described, the frequency band is switched to the frequency and of the second base station BS2 after the notification of the time difference τ from the mobile station MS. The switching can occur immediately or after a predetermined time. However, by adopting a structure in which the phase of the spread code in the upstream traffic channel is initialized immediately after the mobile station MS notifies the time difference τ, the second base station BS2 for initializing the upstream traffic channel reception-use spread code can more efficiently establish synchronization when the time difference τ of the frame timing is sent from the first base station BS1.

Note in this case, when the notification of the time difference τ from the first base station BS1 relative to the second base station BS2 is accompanied with a transmission delay, a discrepancy will occur between the phase of the upstream traffic channel signal and the phase of the spread code of the second base station BS2. Although in this case, the frame phase can be synchronized by the phase correction of the radio frame according to the second or third embodiment shown in FIG. 3 or FIG. 4.

Figure 12:
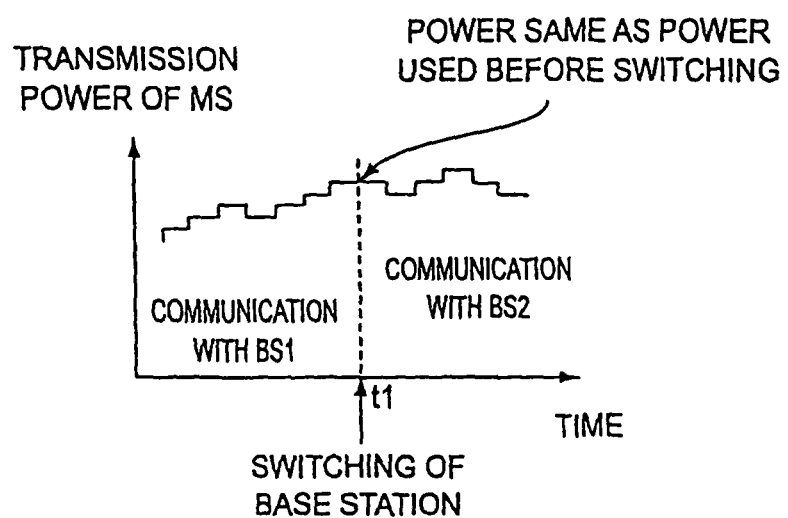
FIG. 12 is a diagram showing a first embodiment of an initial transmission of power after a handover according to the present invention.

Next, a discussion of the initial power required for transmission with respect to the second base station BS2 by the mobile station after handover. FIG. 12 shows a first embodiment of the initial transmission power after handover according to the present invention. The abscissa shows the time, which indicates that the handover is carried out at time t1. Further, the ordinate shows the transmission power of the mobile station MS.

The second base station BS2 for performing the phase correction of the radio frame according to either the second or third embodiments shown in FIG. 3 or FIG. 4, receives the upstream traffic channel signal transmitted to the first base station BS1 by the mobile station MS. Further, the second base station despreads the signal and establishes synchronization of the phase of the spread code. Thus, if synchronization is normally established, this means that the upstream traffic channel signal from the mobile station MS is normally received.

As shown in FIG. 12, the mobile station MS performs the transmission even immediately after the handover with the same power as the power transmitted to the first base station BS1 immediately before the handover. After this, the mobile station MS can perform closed loop control of the transmission power between the second base station BS2 and the mobile station MS.

Figure 13:
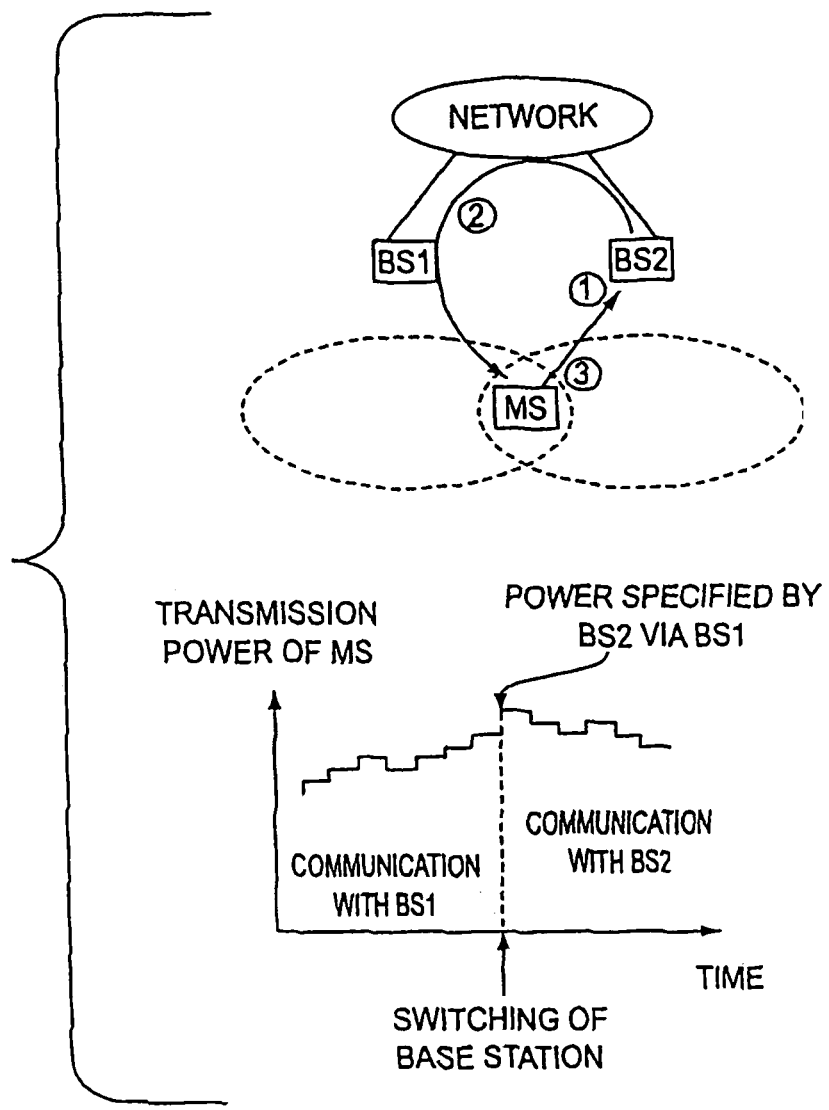
FIG. 13 is a diagram showing a second embodiment of an initial transmission of power after a handover according to the present invention.

FIG. 13 shows a second embodiment of the initial transmission power after handover according to the present invention. The initial transmission power forwarded to the second base station BS2 by the mobile station MS after handover is determined as follows.

Immediately before the handover, the upstream traffic channel signal from the mobile station MS to the first base station BS1 has been already received at the second base station BS2. Therefore, the second base station BS2 determines the optimum transmission power of the mobile station MS based on this signal and notifies the same to the mobile station MS.

In order to determine the optimum transmission power, the second base station BS2 measures a ratio of the energy per Bit of the signal and the interference power $Eb/I_o$ etc. of the reception level of the upstream traffic channel signal from the mobile station MS. The second base station BS2 then determines the initial transmission power of the mobile station MS after the handover (switch of the frequency band) by using the information.

The second base station BS2 transmits the value of the initial transmission power after the handover to the mobile station MS via the higher rank communication network and the first base station BS1 to specify the transmission power of the mobile station MS.

Figure 14:
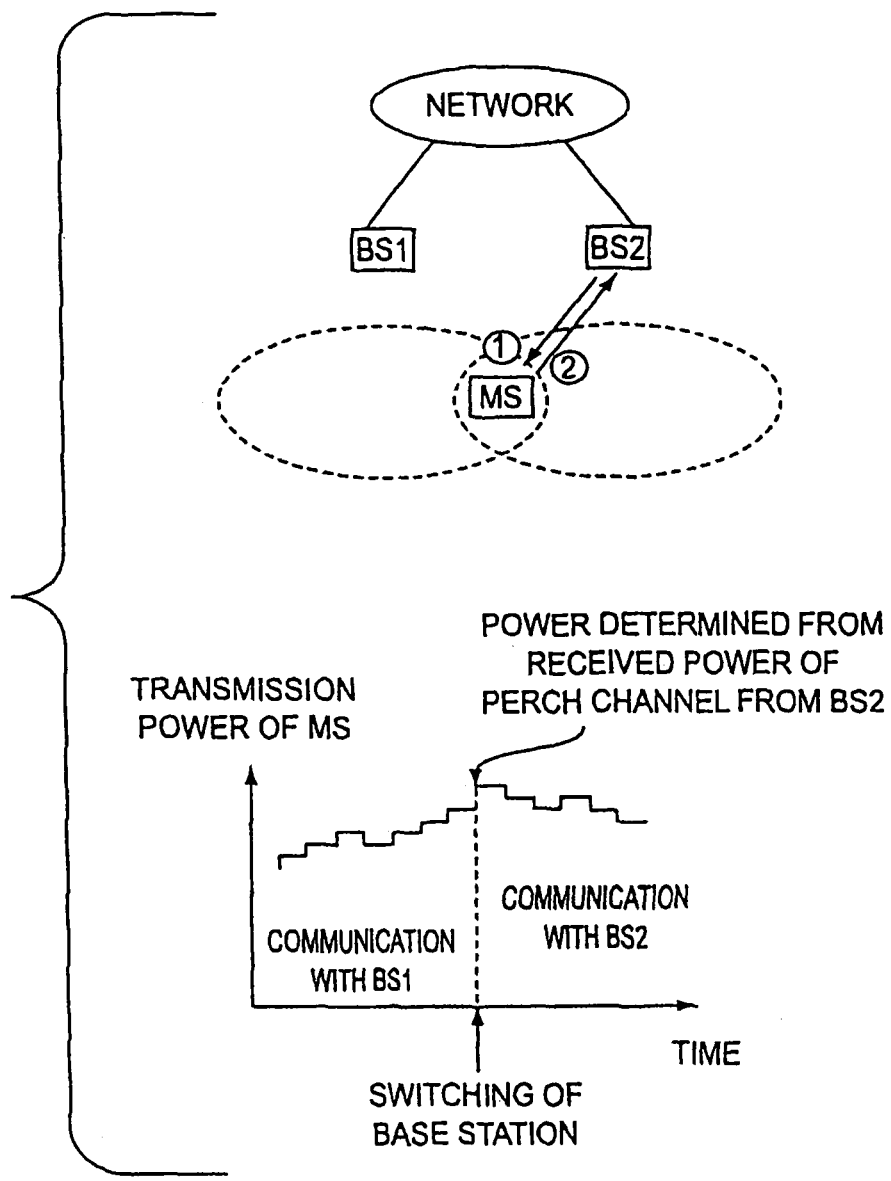
FIG. 14 is a diagram showing a third embodiment of an initial transmission of power after a handover according to the present invention.

FIG. 14 shows a third embodiment of the initial transmission power after the handover according to the present invention. It is also possible to further determine the initial transmission power forwarded to the second base station BS2 by the mobile station MS after the handover, as follows.

The mobile station MS determines the optimum transmission power based on the measurement information such as the ratio of the energy per bit of the signal and the interference power $EB/I_o$ of the reception level of the perch channel signal from the second base station BS2 measured in the empty time period of the compression mode, as mentioned above.

The mobile station MS performs the transmission after the handover with the optimum determined power. Thereafter, the closed loop transmission power control is carried out between the second base station BS2 and the mobile station MS.

Figure 15:
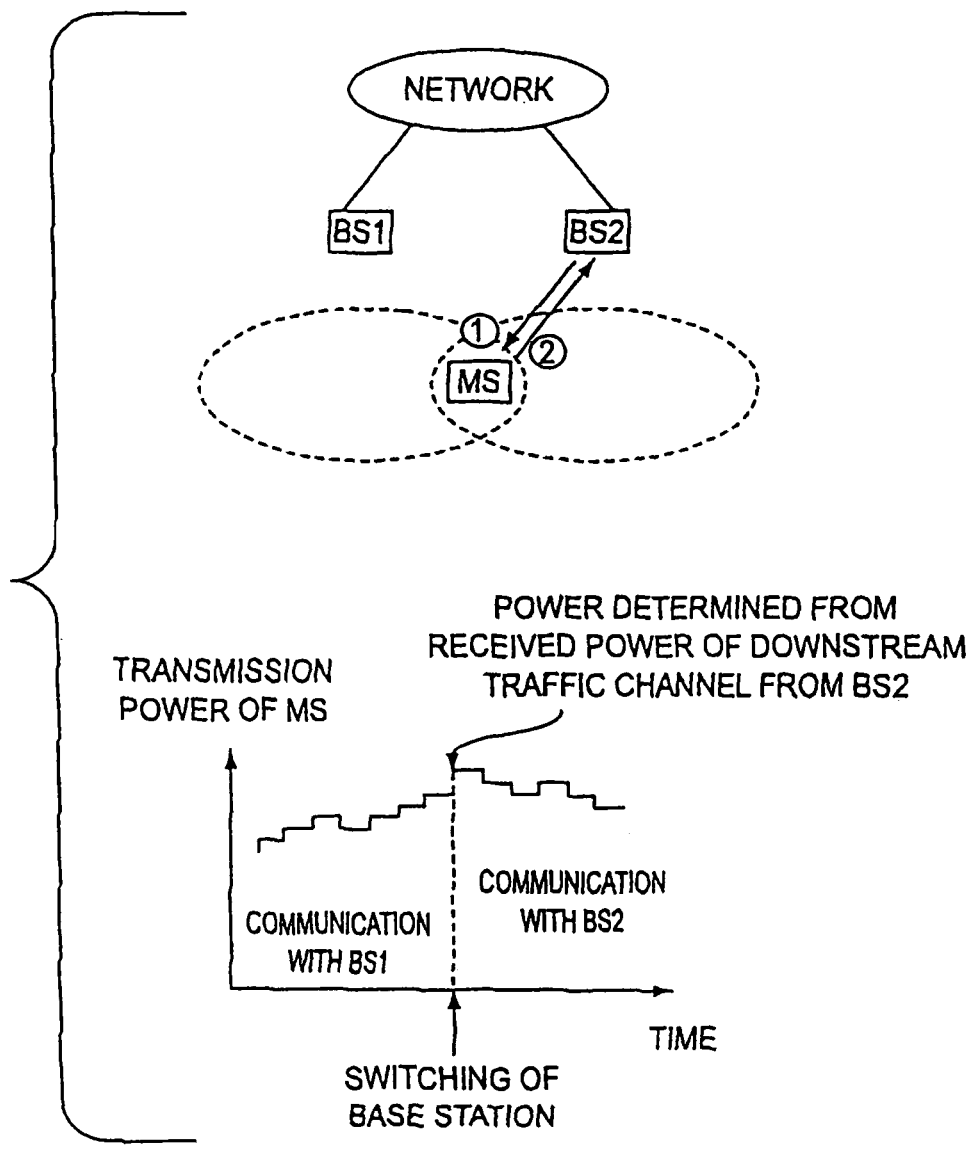
FIG. 15 is a diagram showing a fourth embodiment of an initial transmission of power after a handover according to the present invention.
Figure 16:
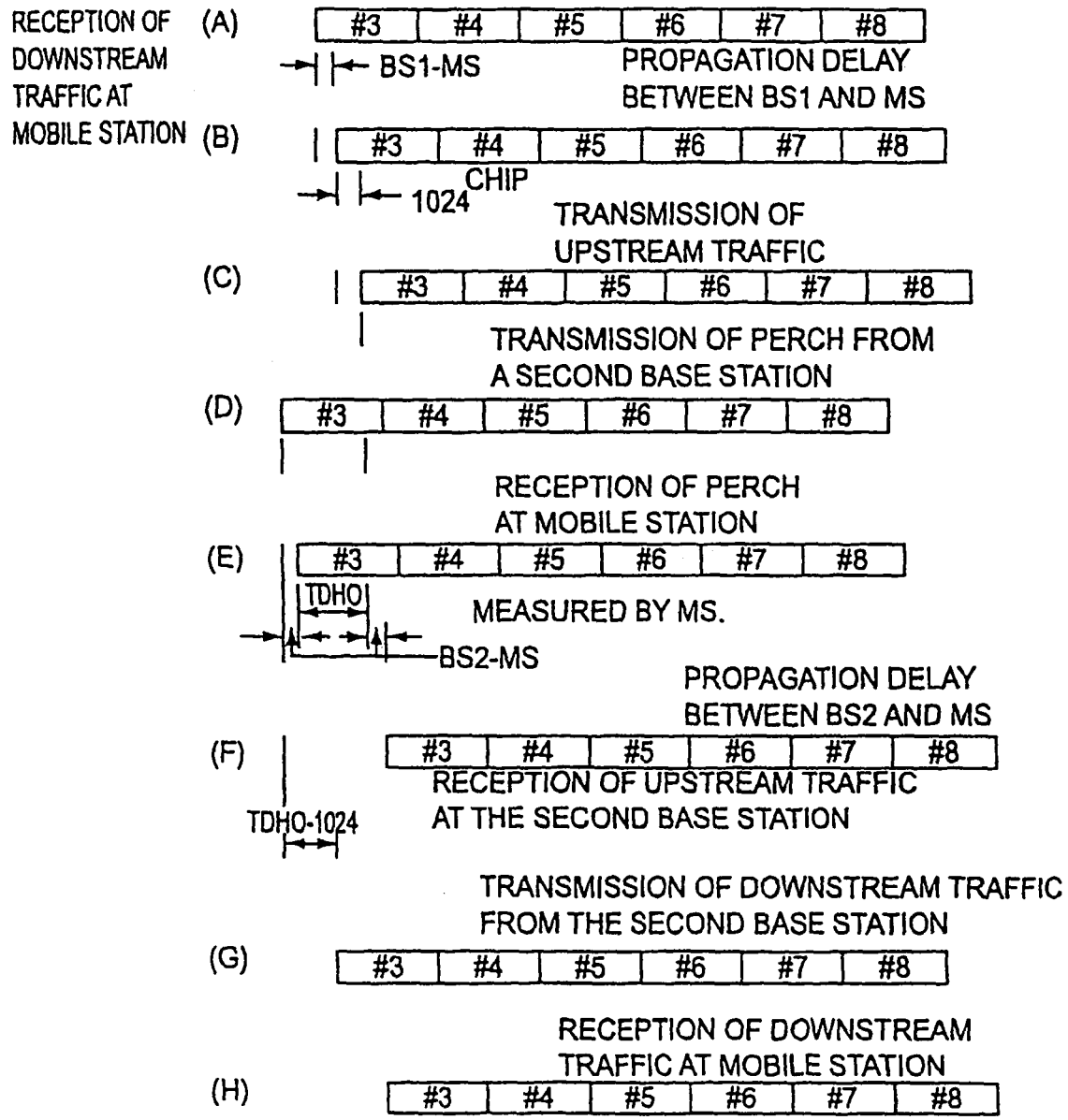
FIG. 16 is a diagram showing the correction of phase for a radio frame of the related art.

FIG. 15 shows a fourth embodiment of the initial transmission power after the handover according to the present invention. It is also possible to further determine the initial transmission power forwarded to the second base station BS2 by the mobile station MS after the handover as follows.

The mobile station MS determines the optimum transmission power based on the measurement information such as the ratio of the energy bit of the signal and the interference power $Eb/I_o$ of the reception level of the downstream traffic channel signal from the second base station BS2 measured in the empty time of the compression mode. Further, the MS performs the transmission after the handover with the optimum determined power. Thereafter, closed loop control of the transmission power is carried out between the second base station BS2 and the mobile station MS.

As described above, according to the present invention, a handover operation can be performed even in the case where the traffic channel is not synchronized between the base stations before and after the handover and the frequency band to be used changes. By performing the phase correction of the radio frame containing the discrepancy of the frame number on the base station side, it is sufficient only to measure for the mobile station the discrepancy between the frame timings within one frame and send the information to the base station. Thus, the load of the mobile station is small, and, on the base station side, even in the case where the transmission delay between the present and the next base station is large, the next base station can optimumly establish synchronization at the handover in a short time. This is accomplished by synchronizing the phase of the spread code for receiving the radio frame in the upstream traffic channel with the phase of the spread code of the radio frame in the upstream traffic channel from the mobile station based on the frame number notified from the present base station.

What is claimed is:

1. A handover method in mobile communications with a mobile station for a handover from a first base station to a second base station at different frequencies, the method comprising:

measuring, by the mobile station, a time difference of a frame timing within one frame between a first radio frame in a first traffic channel and a radio frame in a perch channel, where the first traffic channel being a channel between the mobile station and the first base station in communication and the perch channel being a channel between the mobile station and the second base station, and sending the measured time difference to the base station;

detecting, at the base station comprising the first and second base stations and a network, the discrepancy of frame numbers between a frame number of the first radio frame and a frame number of the radio frame of the perch channel; and performing, by the second base station, a phase correction of a second radio frame in a second traffic channel for transmitting a signal to the mobile station, the phase correction making a phase of the second radio frame matched to a phase of the first radio frame, and the phase correction including a correction of the time difference of the frame timing within one frame and a correction of the discrepancy of frame numbers between the first radio frame and the second radio frame, based on information of the time difference measured by the mobile station and the discrepancy detected by the base station side.

2. A base station in mobile communications with a mobile station, the base station being a destination of a handover from a first base station at different frequencies, the base station comprising:

a phase correction unit configured to perform a phase correction of a second radio frame in a second traffic channel for transmitting a signal to the mobile station, the phase correction making a phase of the second radio frame matched to a phase of a first radio frame in a first traffic channel, and the phase correction including a correction of a time difference, which is measured by the mobile station, of a time difference of a frame timing within one frame and a correction of a discrepancy of frame numbers between the first radio frame and the second radio frame, based on a discrepancy, which is detected at a base station comprising the first and second base stations and a network, of frame numbers between a frame number of the first radio frame and a frame number of a radio frame of the perch channel, and based on information of the time difference, measured by the mobile station, between the first radio frame and a radio frame in the perch channel, where the first traffic channel being a channel between the mobile station and first base station in communication and the perch channel being a channel between the mobile station and the second base station.

3. A mobile station in mobile communications performing a handover from a first base station to a second base station at different frequencies, the mobile station comprising:

a measuring unit configured to measure a time difference of a frame timing within one frame between a first radio frame in a first traffic channel and a radio frame in a perch channel, the first traffic channel being a channel between the mobile station and the first base station in communication, and the perch channel being a channel between the mobile station and the second base station, the second base station including a phase correction unit configured to perform a phase correction of a second radio frame in a second traffic channel for transmitting a signal to the mobile station, the phase correction making a phase of the second radio frame matched to a phase of the first radio frame, and the phase correction including a correction of a time difference of a frame timing within one frame and a correction of a discrepancy of frame numbers between the first radio frame and the second radio frame, based on information of the time difference measured by the mobile station, and a discrepancy, which is detected at a base station comprising the first and second base stations and a network, of frame numbers between a frame number of the first radio frame and a frame number of a radio frame in the perch channel.

4. The handover method according to claim 1 further comprising:

notifying, by the mobile station, information of the time difference to the second base station via a base station in communication.

5. A mobile communication system comprising a mobile station and a base station, the system performing a handover from a first base station to a second base station at different frequencies, wherein the mobile station comprises a measuring unit configured to measure a time difference of a frame timing within one frame between a first radio frame in a first traffic channel and a radio frame in a perch channel, the first traffic channel being a channel between the mobile station and the first base station in communication, and the perch channel being a channel between the mobile station and the second base station, and the second base station comprises a phase correction unit configured to perform a phase correction of a second radio frame in a second traffic channel for transmitting a signal to the mobile station, the phase correction making a phase of the second radio frame matched to a phase of the first radio frame, and the phase correction including a correction of a time difference of a frame timing within one frame and a correction of a discrepancy of frame numbers between the first radio frame and the second radio frame, based on information of the time difference measured by the mobile station and a discrepancy, which is detected at a base station comprising the first and second base stations and a network, of frame numbers between a frame number of the first radio frame and a frame number of a radio frame in the perch channel.

6. The mobile communication system according to claim 5, wherein the mobile station further comprises a notifying unit configured to notify the information of a time difference to the second base station via a base station in communication.

* * * * *